Nov. 10, 1931.  B. HOLM-HANSEN  1,831,176
MANUFACTURE OF SEED BLOCKS
Filed Jan. 22, 1931   3 Sheets-Sheet 1
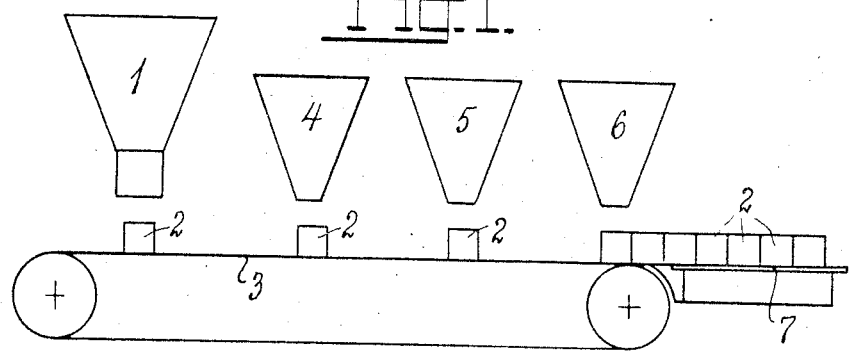
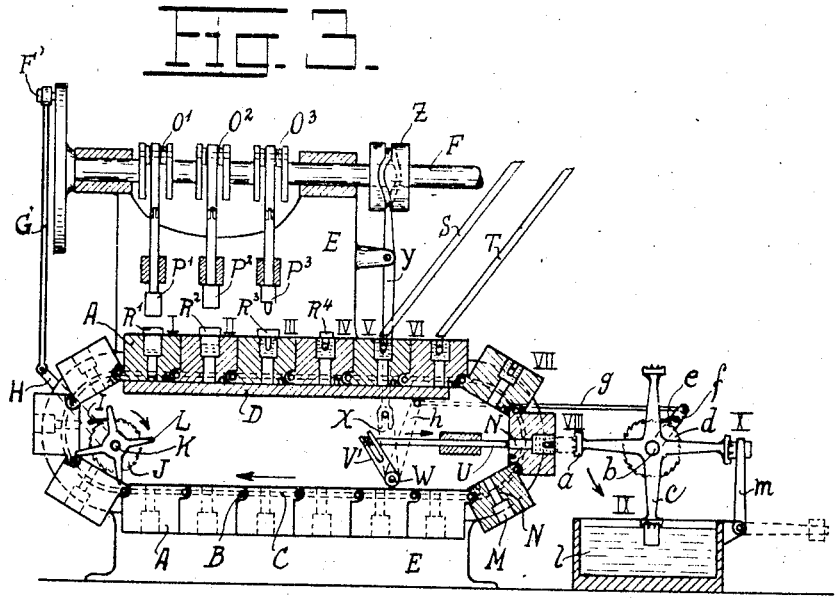
Birger Holm-Hansen
By Newell & Spencer
ATTORNEY Nov. 10, 1931.                B. HOLM-HANSEN                    1,831,176
                         MANUFACTURE OF SEED BLOCKS
                            Filed Jan. 22, 1931        3 Sheets-Sheet 2
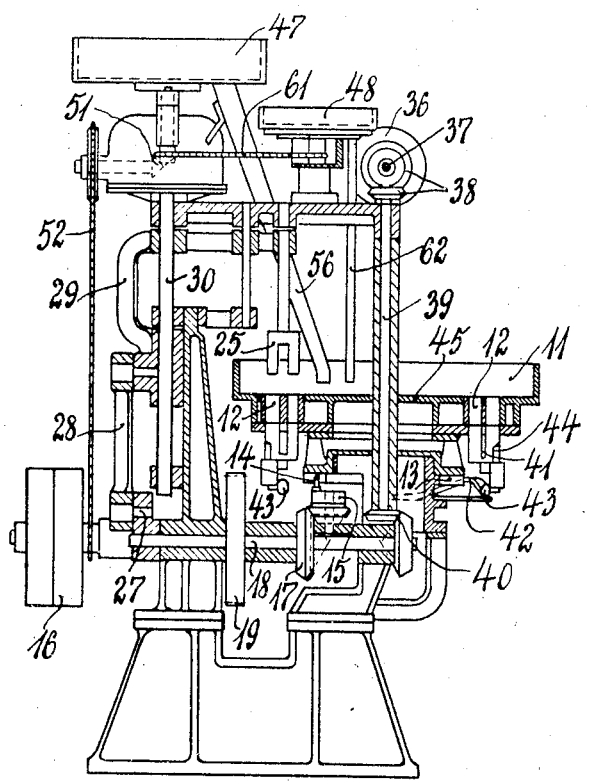
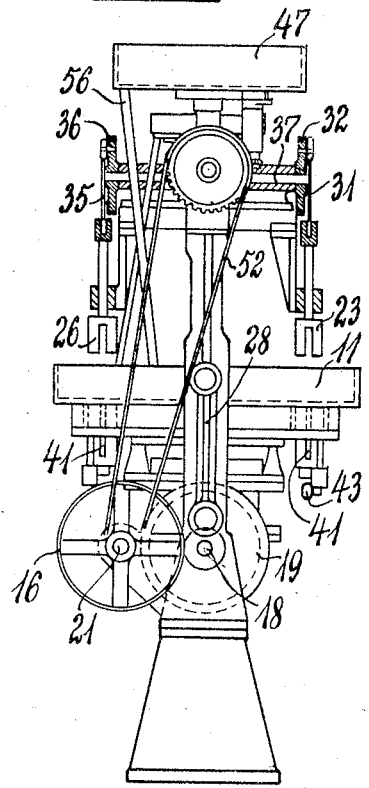
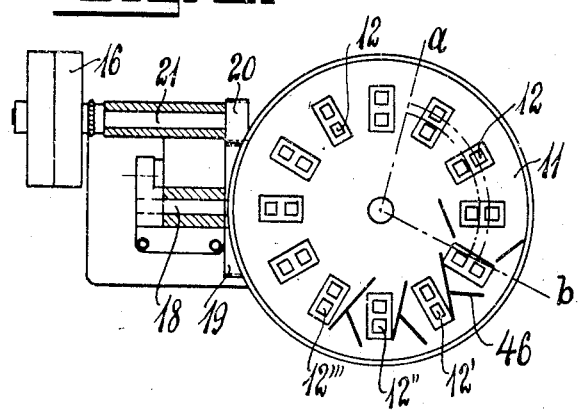
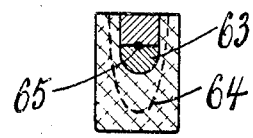
Birger Holm-Hansen
By
    ATTORNEY Nov. 10, 1931.  B. HOLM-HANSEN  1,831,176
MANUFACTURE OF SEED BLOCKS
Filed Jan. 22, 1931    3 Sheets-Sheet 3
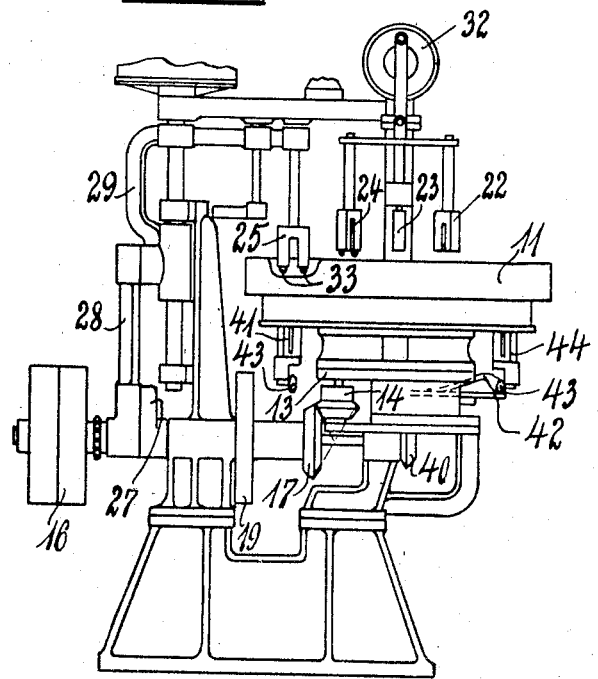
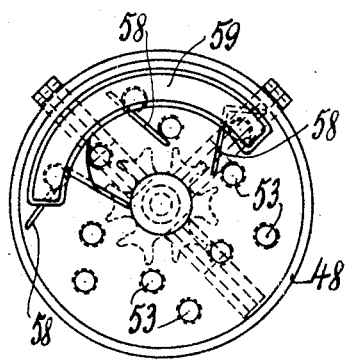
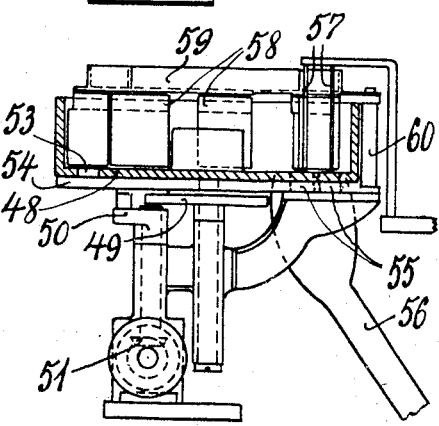
Birger Holm-Hansen
By
ATTORNEY Patented Nov. 10, 1931

1,831,176

UNITED STATES PATENT OFFICE

BIRGER HOLM-HANSEN, OF OSLO, NORWAY, ASSIGNOR TO INTERNATIONAL SKOGPLANT-NINGSMETODE AKTIESELSKAP, OF OSLO, NORWAY

MANUFACTURE OF SEED BLOCKS

Application filed January 22, 1931, Serial No. 510,416, and in Norway July 9, 1929.

My invention relates to the planting of seed, especially for forestry purposes. It is a known process in the production of plants to put the seed in pots or blocks formed out of a material, which, when the seed has developed into a small plant, and the latter put in the soil without removing it from the block, will decay or disintegrate sufficiently to allow the roots of the plant to penetrate the block and grow further in the soil surrounding the block.

This method of seed planting has its greatest importance for the forestry, but in order to be used for this special purpose, it must be possible to carry it out in a cheap and easy way. The present invention has for its purpose to solve this problem by carrying out the whole process from the production of the blocks till the placing of the blocks provided with seed planted in suitable soil in the blocks, in a wholly mechanical and wholly or nearly automatic manner.

The invention comprises a process and the means to carry out this process in mechanical manner on a great scale and in a practically useful form. It comprises a process suitable for the mechanical production of the blocks for such purpose.

It also comprises specific materials or compositions of materials for the blocks and a manner of treating these blocks after the production, so that they are made durable and resistant during the handling and so that they will ensure the growth of the seed and the development of the plant before the final planting.

As material for the blocks heretofore peat or peaty material has been used, or such material mixed with other suitable matter for instance fertilizing materials or soil. I may also make use of this kind of material. I have however found it more advantageous to use a mixture of crushed charcoal and loamy soil. In some instances I mix with this material straw, hair or fibres of any kind. A point in the invention is also to provide a protecting layer on the outside of the blocks. As such may be used wax or paraffin or paraffined paper.

Generally speaking the process when carrying out the invention is as follows:

The material from which the blocks are to be made is carried by a conveyer for instance a band or a tube on to a flat working table. This table is combined with or made integrally with a press table provided with moulds. Above this press table, which can be operated with a rectilinear or a rotary movement, is arranged a pressing apparatus. It is preferable that the pressing operation be carried out in a step by step manner. Thus the mould may be first filled with some block material, whereafter the press die goes down in the mould and compresses the material. Then the mould is moved a further step. More material is supplied and another pressing operation takes place. This can be repeated two or more times. The block when ready has a cavity to take up the soil with the seed.

Having in the foregoing given a general explanation of the purpose of the invention, I shall now in a more particular manner describe the process and the means most suitable for carrying out the invention on an industrial scale, having reference to the annexed drawings, of which: Fig. 1 is a diagrammatic layout showing the process as a whole.

Fig. 2 is a cross section of a planting block with the seed in it.

Fig. 3 is a diagram for illustrating the process by showing the combination of mechanical means adapted for carrying out the process in a wholly automatic manner. The drawing is a vertical view partly in section.

Fig. 4 is a vertical section through a preferred form of a machine used in carrying out the invention.

Fig. 5 is a plan view, partly in section, of the machine.

Fig. 6 is a front view of the machine.

Fig. 7 is a side view of the machine.

Fig. 8 is a plan view of the reservoir for soil with which the cavities in the blocks are to be filled.

Fig. 9 is a vertical view partially in section of the same.

Referring to Fig. 1 on the drawings, 1 represents the pressing apparatus from which a block 2 in its finished form is supplied to a movable band or work table 3, upon which it is carried further. The block is at 4 supplied with part of the soil mixture which is to be used. Then a further step forward is made, whereafter at 5 the seed is supplied. Finally at 6 a layer of soil is placed on top of the seed. It is now advisable that the soil in the cavity be compressed before the block is removed from the machine and placed on a band or board or other storing device for being carried away. It is also recommendable to impregnate the blocks with a suitable substance, so as to make them more durable and resistant, which can be done by dipping them in a mass of melted wax, paraffin or similar substance which should be of such nature that the resulting outer layer on the blocks will not prevent the roots from penetrating into the surrounding soil when the blocks have been placed in the soil.

Referring to Fig. 3, A represents members in a chain, each member serving as a mould to form seed bocks. B are pins by which the moulds are connected to form a continuous chain and these pins project on each side with their ends into a groove C, having two horizontal parts connected at their ends with semi-circular parts.

In this way six (or it may be more) of the moulds, being those in operation for forming the blocks, will always be moved in a horizontal plane, in effect constituting part of a working table, and will rest during this part of their travel on a plate D, which affords the necessary support during the pressing operation. This plate D is fixed to or forms a part of the frame E of the machine, carrying at the top the driving shaft F. From this driving shaft the chain is imparted a step by step motion by means of a crank pin F' and rod G connected with the arm H, which, by means of a pawl I and ratchet wheel J on a shaft K, turns the cross wheel L an angular distance such that the chain with which the arm of the cross wheel is in engagement is moved during each revolution of the driving shaft F a distance equal to the length of one chain member. This distance is in the present instance 90°. Each of the chain members has a moulding cavity M, corresponding in form with the seed blocks to be produced. Below these cavities there is placed in the chain member an ejector N capable of a longitudinal motion.

On the driving shaft are provided cranks $O^1$, $O^2$, $O^3$ and connected therewith presser dies $P^1$, $P^2$, $P^3$. Openings $R^1$, $R^2$, $R^3$ and $R^4$ are provided in the vertical frame plate, through which material to be supplied to the moulds is pushed from a part of the working table behind the frame plate to the successive moulds or chain members.

The six moulds resting on the plate D and representing as many stages in the process are marked I, II, III, IV, V and VI. In the stage I the die $P^1$ compresses a mass of block material to fill the lower part of the mould; in the stage II the die $P^2$ compresses a further quantity of material. In the stage III the block is pressed to its final size and form by the die $P^3$, this die being so shaped that simultaneously with the finishing compression a cavity is formed in the block for taking up soil and the seed.

In the stage IV some soil is now pushed into this cavity but not so much as to fill it completely. Thereupon in the stage V seed is supplied through a tube S and in the stage VI soil through the tube T is supplied so as to cover the seed. The contents of the cavity may now be exposed to some pressure, which may be done at the stage VII, for instance, by means of one or more springs beneath which the mould may pass on its way to the last station VIII, when the block is pushed out of the mould, and transferred to the conveyor or other storing device.

In the drawings, which is only serving as a means of clearly illustrating the series of operations and not as a preferred design of a machine, these two last stations of the chain members are illustrated as being located at the downward travel of the moulds, but in practice it is preferred to have all stages of operations arranged while the chain members still are travelling horizontally.

The expulsion of the completed block from the mould is performed by means of a rod U connected with an arm V' on a shaft W carrying another arm X which is in engagement with the lower end of a lever Y whose upper end projects into a cam slot in the cam wheel Z on the driving shaft.

When the rod U hits the ejector N this latter pushes the block out of the mould and presses it against a gripper $a$.

This gripper is placed on the ends of a four-armed cross $c$, which is rotatably mounted on a shaft $b$, the latter being imparted a step by step rotation by means of a pawl and ratchet mechanism consisting of a ratchet wheel $d$ on the said shaft and a pawl $e$ on a freely movable arm $f$, a rod $g$ connecting this arm with an arm $h$ on the aforesaid shaft W. As this shaft is imparted a rocking movement by means of the lever Y, this motion will also be imparted to the rod $g$. 1 is a basin containing impregnating material and, as shown, when the block is taken by the gripper, it will be carried down and dipped into this basin (station IX). Thereafter, it will by the next movement of the four-armed cross $c$ be lifted to the station X where it is removed from the gripper in any convenient way, for instance by a second gripping device, e. g., a spring clip arm $m$, which places it, by a 90° swinging motion, on a belt or board. This spring clip arm should preferably be provided with some protruding pins where it touches the block so that holes are formed in the impregnating material to give access of air to the block.

In the drawings Figs. 4–9 I have shown, as an example of a machine for carrying out the invention, an automatically working machine with a working table having a rotatory motion. This machine, generally speaking, performs its work substantially in the same manner as the machine shown diagrammatically in Fig. 3, the operation of which, as far as regards the process, subject matter of my invention, has been described above.

In this embodiment the rotatable press table 11 is provided with moulds 12 and by means of a Maltese cross or Geneva gear rotated step by step about its center. The Maltese cross 13 is driven by means of a pin 14 eccentrically mounted on a bevel gear 15, which in turn is driven by means of the pulley 16, through a bevel gear 17, a shaft 18, a gear 19, a pinion 20 and the shaft 21. The moulds 12 are arranged in a circle around the center of the table. In the embodiment shown a number of moulds are grouped at each station on the table, in this case two mould cavities are positioned radially to the table at each station which permits of the simultaneous production of two pieces, whereby the output of the machine is doubled. In this way it becomes possible, for instance, in a working shift of eight hours to produce about 24,000 blocks.

Above the press table which is rotatably mounted in the machine frame are two pre-compressing dies 22 and 23, a pressing die 24 (Figs. 4, 6 and 7) and two pressing dies 25 and 26. The pre-compressing dies 22 and 23 and the pressing die 24 operate to produce the pressed blocks, to provide the cavities for the admission of soil and seed, while the pressing dies 25 and 26 successively slightly compress the soil and seed lodged in the cavity. The pressing die 25 is driven by the shaft 21 through a crank device 27 and 28 the crank 27 of which is keyed to the end of the shaft 18. The connecting rod 28 engages an arm 29 which is slidably mounted on a fixed rod 30.

The pre-compressing dies 22 and 23 and the pressing die 24 are similarly driven by means of a crank device 31, 32. The die 24 is on its lower surface provided with knobs 33, which during the last compression of the material in the mould simultaneously form the cavity in the pressed piece. Similar knobs 33 on the pressing die 25 serve to compress the soil in seed cavity.

The last pressing die 26 is driven by means of crank devices 35 and 36 (Fig. 6). The crank discs 32 and 36 are mounted on the ends of a shaft 37 and connected with the shaft 18 by means of a pair of bevel gears 38, a shaft 39 and a pair of bevel gears 40.

The step by step rotation of the press table 11 and the up and down movement of the pre-compressing dies and the pressing dies is effected by means of a common operating device i. e. dependent on each other.

The moulds 12 are closed at the bottom by means of plungers 41, vertically displaceable in the moulds. These operate to discharge the finished pieces from the moulds, so that they may be removed by the operator. The control of the reciprocating movements takes place by means of a cam 42 which is secured below the press table 11, in engagement with the rollers 43 rotatably mounted on the lower side of the plungers 41. The shape of the cam 42 is such that the plungers 41 from a predetermined position of the press table 11 (see line $a$ in Fig. 5) are raised to a higher position and remain in this position during a certain angle of rotation of the table, whereupon they are lowered until they have reached the lowermost position (see line $b$ in Fig. 5). The plungers 41 are preferably not only guided in the moulds, but also in the rods 44, which are fastened to the table.

Immediately above the mould plate 45 on the press table 11, filling members 46 are provided between the pre-compressing dies and the pressing die, so that the said members, when the table is not moved (at the end of one step of rotation) always are located between the moulds 12. These members 46 provide for an automatic filling of the moulds through the rotation of the press table.

The supply of soil and seed to the cavities takes place from special proportioning devices, tables or reservoirs 47, 48. The soil reservoirs 47 are provided with suitable means for supplying a suitable quantity of soil adapted to the size of the cavity. The proportioning device by which this is accomplished, as shown most clearly in Figs. 8 and 9, consists of a reservoir 47, 48 which by means of a Maltese cross or Geneva gear 49, is rotated step by step. The Maltese cross is driven by means of a crank 50 through a pair of bevel gears 51 which by means of a chain 52 are connected with the main driving shaft 21. In the bottom of the table 48 is drilled a plurality of proportioning holes 53, the size of which corresponds to the quantity of soil to be filled in. The proportioning holes 53 are covered by a fixed circular ring 54 on which the table 48 rotates. This ring 54 has two passages 55, and is arranged in such a manner relative to the table, that the openings 55 are aligned with the proportioning holes 53 at each position of rest of the table 48, so that the content of the proportioning holes 53, when in alignment with the openings 55 may fall out and through a tube 56 be carried to the press table and the moulds 12. To ensure that the proportioning holes are thoroughly emptied plungers 57 are provided over the openings 55, which plungers are actuated automatically from the machine and are pressed into the holes 53 as soon as the table is at rest, to remove the soil which may adhere to the edge of the holes and push it out through the holes 55 and into the tube 56.

The filling of the porportioning holes 53 takes place similarly to the filling of the moulds 12 automatically by means of members 58, which are fastened to a segment 59 and extend to the bottom of the table 48. The segment 59 is stationary and carried by the machine frame as by means of uprights 60.

The reservoir 47 is supplied with soil either by hand or by means of a conveyer so that it is always covered by a layer of soil. In this way is obtained the result that the proportioning holes 53 which are emptied through the openings 55, again are filled on further rotation of the table, the soil at each further rotation of the table being stowed up at the members 58 and falling down into the proportioning holes 53.

The proportioning device of the seed reservoir 48 operates exactly in the same way as the proportioning device of the soil reservoir 47. The former is driven through a chain 61 (Fig. 4) by means of the bevel gears of the soil proportioning device. The seed is carried to the moulds or the blocks through a tube 62.

The machine operates in the following manner. The block material e. g. peat dust is supplied to the press table 11 by a conveyor or by hand, similar to the way in which the proportioning device 47 receives the soil, and in such quantities that the press table always is covered by a layer of a thickness of at least 3–4 cm. By the step by step rotation, the peat dust reaches the first filling members and is swept down by the latter into the first mould 12'. After the first rotation the table is stopped, whereupon the first compressing dies 22 pass into the mould and partially compress the peat dust. On the further rotation of the table the moulds which are first filled, arrive below the second filling member so that they are filled with peat dust the second time. This second filling is compressed by the second compressing die 23 upon the moulds having reached the position 12''. On the next rotation of the table 11, the moulds are filled by the third filling member and the third filling compressed by the die 24 in the position 12'''.

During this pressing the cavity 63 (Fig. 2) for soil and seed is simultaneously formed. When the table 11 is stopped the next time, this cavity is partially filled with soil from the proportioning device of the soil reservoir 47 and compressed by the pressing die 64. At the next position of rest of the table the seed 65 (Fig. 2) will fall from the seed proportioning device of the seed reservoir 48 into the cavity which is partially filled with soil, and in the next position of the table the seed is covered with soil. This second filling of soil, which also takes place automatically from the proportioning device of the soil reservoir 47, is when the table is again stopped, compressed by a slight pressure of the die 26, so as to establish a suitable contact between the seed and the soil.

The further rotation of the table actuates the plungers 41 to engage with the cam 42, and the finished blocks are raised out of the mould. Upon the plungers 41 having rolled down on the cam and thus again arrived at their lowermost position, the individual operations described above are repeated.

I have found it preferable to carry out the process using presser dies of a special form in order to obtain a uniformly and well compressed block. For this purpose the presser dies are provided with a head of less diameter than the moulds and having a conical form with a rounded end whereby the material is compressed not only axially but also transversely in the mould. I have indicated with dotted lines in Fig. 2 at 64 such form of the presser head and the form of cavity in the block thereby produced. By a suitable filling of this cavity of material for the next pressing operation and employing for this a presser head of somewhat smaller dimensions a very uniformly compressed block of great resistance may be obtained. I am thereby enabled to make use of material for forming the blocks which at the same time secures a block of great resistance as of a physical and chemical nature suitable for the rapid growth of the plant and its roots.

Although I have shown in the accompanying drawings and described above a preferred form of my invention and have suggested various modifications thereof, it is to be understood that numerous other changes and modifications may be made by those skilled in the art without departing from the scope of my invention.

Claims:

1. An apparatus for forming seed blocks and planting seed, comprising a set of moulds for forming seed blocks from a suitable material by a pressing operation, means to move said moulds by a step by step motion successively to a plurality of stations, means at each station to supply material to the moulds, presser dies cooperating with said moulds to successively compress the material supplied to the moulds, said presser dies each having a head entering the mould, of less diameter than the latter and of a conical form so as to exert a compressing action axially as well as transversely and leaving a cavity in the material after each pressing operation, means to supply soil and seed to the cavity in the mould formed by the last pressing operation, and means to cover the seed with soil, means to compress the contents of the cavity and means to remove the finished seed block from the mould.

2. An apparatus for forming seed blocks and planting seed comprising a set of moulds for forming seed blocks from a suitable material by a pressing operation, means to move said moulds by a step by step motion successively to a plurality of stations, means at each station to supply material to the moulds, presser dies cooperating with said moulds to successively compress the material supplied to the moulds, the last one of said dies having a projection of less diameter than the moulds to form a cavity in the moulded block, means to successively supply soil and seed to the so formed cavity and means to cover the seed with soil, means to compress the contents of the cavity, means to remove the finished seed block from the mould, a gripping device adapted to engage the seed block at its top side, means to move the gripping device by a step by step motion to a container of impregnating material so as to bring the block into the impregnating material with its top edge above the surface of the latter and means for subsequently carrying the block to a storage device.

3. In an apparatus for forming seed blocks and planting seed in combination, a frame, a main driving shaft, a working table, a soil reservoir, and a seed reservoir, all of which having a step by step motion imparted from the driving shaft by suitable gearing, means to continually supply moulding material to the working table, means for proportioning soil and seed to be delivered from the respective reservoirs to the working table, at predetermined intervals, a plurality of moulds in the working table, a plurality of dies working in said moulds to successively compress material therein, dies to compress soil filled in the cavities in the moulds and means to remove the finished blocks from the moulds.

4. In an apparatus for forming seed blocks and planting seed in combination, a frame, a main driving shaft, a working table, a soil reservoir and a seed reservoir, all of which having a step by step rotary motion imparted from the driving shaft by suitable gearing, means to continually supply moulding material to the working table, means for proportioning soil and seed to be delivered from the respective reservoirs to the working table at predetermined intervals, a plurality of moulds in the working table, a plurality of dies working in said moulds to successively compress material therein, dies to compress soil filled in the cavities in the moulds and means to remove the finished blocks from the moulds.

5. In an apparatus for forming seed blocks and planting seed, the combination with a plurality of moulds, of a plurality of presser dies, means to supply material and seed to the moulds, means to move the moulds in a step by step movement, a device for dipping them in impregnating material, means to remove the finished blocks from the moulds and to transfer them to said device, and a gripping device for transferring them from the impregnating device to a transporting and storing device, said gripping device being in the form of spring clip arms, having points penetrating the covering of impregnating material, so as to leave access of air at suitable points of the sides of the blocks.

In testimony whereof I have signed my name to this specification.

BIRGER HOLM-HANSEN.